(12) United States Patent
Vadlamani et al.

(10) Patent No.: US 10,487,762 B2
(45) Date of Patent: Nov. 26, 2019

(54) SYSTEMS AND METHODS FOR PREDICTIVE AND AUTOMATIC ENGINE STOP-START CONTROL

(71) Applicants: Uday Vadlamani, Bothell, WA (US); Carl Anders Hergart, Bellingham, WA (US); Michael D. Gerty, Bellingham, WA (US)

(72) Inventors: Uday Vadlamani, Bothell, WA (US); Carl Anders Hergart, Bellingham, WA (US); Michael D. Gerty, Bellingham, WA (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 15/716,315

(22) Filed: Sep. 26, 2017

(65) Prior Publication Data

US 2019/0093581 A1 Mar. 28, 2019

(51) Int. Cl.
*B60W 30/00* (2006.01)
*F02D 41/04* (2006.01)
(Continued)

(52) U.S. Cl.
CPC ..... *F02D 41/042* (2013.01); *B60W 30/18072* (2013.01); *F02D 41/062* (2013.01);
(Continued)

(58) Field of Classification Search
CPC ............. F02D 41/042; F02D 2200/701; F02D 2200/702; B60W 10/06; B60W 10/18;
(Continued)

(56) References Cited

U.S. PATENT DOCUMENTS 4,706,522 A 11/1987 Nitz
6,616,569 B2 9/2003 Hoang et al.
(Continued)

FOREIGN PATENT DOCUMENTS

DE 10 2009 006 664 A1 9/2010
EP 1 052 401 A2 11/2000
(Continued)

OTHER PUBLICATIONS

Extended European Search Report dated May 25, 2018, issued in corresponding European Application No. 17199329.8, filed Oct. 31, 2017, 7 pages.
(Continued)

*Primary Examiner* — Thomas N Moulis
(74) *Attorney, Agent, or Firm* — Christensen O'Connor Johnson Kindness PLLC

(57) ABSTRACT

In some embodiments of the present disclosure, sensors mounted on a vehicle can allow opportunities for coasting to be predicted based on environmental conditions, route planning information, and/or vehicle-to-vehicle or vehicle-to-infrastructure signaling. In some embodiments of the present disclosure, these sensors can also predict a need for power and/or an end of a coast opportunity. These predictions can allow the vehicle to automatically enter a coasting state, and can predictively re-engage the engine and/or powertrain in order to make power available with no delay when desired by the operator.

23 Claims, 6 Drawing Sheets

(51) Int. Cl.

| | |
|---|---|
| *F02D 41/06* | (2006.01) |
| *B60W 30/18* | (2012.01) |
| *F02D 41/12* | (2006.01) |
| *F02N 11/08* | (2006.01) |
| *F02D 41/02* | (2006.01) |
| *F02D 41/14* | (2006.01) |

(52) U.S. Cl.
CPC ......... *F02D 41/065* (2013.01); *F02D 41/123* (2013.01); *F02N 11/0814* (2013.01); *F02D 41/022* (2013.01); *F02D 2041/1412* (2013.01); *F02D 2200/021* (2013.01); *F02D 2200/101* (2013.01); *F02D 2200/501* (2013.01); *F02D 2200/503* (2013.01); *F02D 2200/70* (2013.01); *F02D 2200/701* (2013.01); *F02D 2200/702* (2013.01)

(58) Field of Classification Search
CPC ....... B60W 2500/20; B60W 30/18018; B60W 30/18072; B60W 20/12; B60W 50/0097; Y02T 10/48; F02N 11/0837; F02N 2200/125; F02N 2200/0801
See application file for complete search history.

(56) References Cited

U.S. PATENT DOCUMENTS

| | | | |
|---|---|---|---|
| 6,629,515 B1* | 10/2003 | Yamamoto | B60K 6/485 123/179.4 |
| 6,763,903 B2 | 7/2004 | Morimoto et al. | |
| 7,657,350 B2 | 2/2010 | Moran | |
| 8,419,592 B2 | 4/2013 | Fujiwara | |
| 8,457,822 B2 | 6/2013 | Ketfi-Cherif et al. | |
| 8,594,912 B2 | 11/2013 | Weaver | |
| 8,972,145 B2 | 3/2015 | Mahler et al. | |
| 9,266,523 B2 | 2/2016 | Ideshio et al. | |
| 9,957,941 B1 | 5/2018 | Gerty et al. | |
| 2010/0019446 A1 | 1/2010 | Matsumoto et al. | |
| 2011/0136620 A1* | 6/2011 | Gibson | B60W 10/02 477/64 |
| 2011/0153119 A1* | 6/2011 | Lee | F02N 11/0837 701/2 |
| 2012/0029730 A1* | 2/2012 | Nagura | F02N 11/0837 701/2 |
| 2012/0100960 A1* | 4/2012 | Pedlar | B60W 10/02 477/171 |
| 2012/0226433 A1 | 9/2012 | Hasan et al. | |
| 2013/0158838 A1* | 6/2013 | Yorke | B60W 10/06 701/103 |
| 2014/0046577 A1* | 2/2014 | Wang | B60W 10/10 701/112 |
| 2014/0107878 A1* | 4/2014 | Takahashi | G01M 15/11 701/22 |
| 2014/0207348 A1* | 7/2014 | Wakayama | F02D 17/00 701/54 |
| 2014/0336908 A1 | 11/2014 | Mori et al. | |
| 2015/0158491 A1* | 6/2015 | Suzuki | B60W 30/18072 701/67 |
| 2015/0166065 A1* | 6/2015 | Kuroki | B60W 10/02 477/185 |
| 2015/0175149 A1 | 6/2015 | Zhao et al. | |
| 2015/0210261 A1* | 7/2015 | Mitsuyasu | F16D 48/06 701/67 |
| 2015/0232099 A1* | 8/2015 | Miller | B60W 10/18 701/70 |
| 2015/0259008 A1* | 9/2015 | Seguchi | B62D 15/025 701/41 |
| 2015/0275787 A1 | 10/2015 | Dufford et al. | |
| 2015/0275840 A1* | 10/2015 | Sawada | F02N 11/0837 701/113 |
| 2015/0369199 A1 | 12/2015 | Nakamura | |
| 2016/0019792 A1* | 1/2016 | Kawamata | B60R 16/0236 701/70 |
| 2016/0107648 A1* | 4/2016 | Carlson | F16H 61/0213 477/107 |
| 2016/0230821 A1* | 8/2016 | Morino | F16D 48/02 |
| 2017/0080919 A1* | 3/2017 | Follen | B60W 20/12 |
| 2017/0174218 A1* | 6/2017 | Hansen | B60W 10/02 |
| 2017/0240162 A1* | 8/2017 | Higashitani | B60L 11/14 |
| 2017/0282921 A1* | 10/2017 | Limbacher | B60W 30/18018 |
| 2017/0349179 A1* | 12/2017 | Cunningham | B60W 10/02 |
| 2017/0350360 A1* | 12/2017 | Tedesco | B60T 7/18 |
| 2018/0057001 A1* | 3/2018 | Hu | B60R 16/0236 |
| 2018/0080425 A1* | 3/2018 | Ose | B60K 6/485 |
| 2018/0120841 A1* | 5/2018 | Endo | B60W 30/18072 |
| 2018/0202408 A1* | 7/2018 | Majima | F02N 11/0825 |
| 2018/0215386 A1* | 8/2018 | Naserian | B60W 30/18154 |
| 2018/0244273 A1* | 8/2018 | Iwamoto | B60W 10/115 |
| 2018/0265090 A1* | 9/2018 | Sharma | B60W 30/18072 |
| 2018/0273047 A1* | 9/2018 | Wang | B60W 50/0097 |
| 2018/0362020 A1 | 12/2018 | Kobler et al. | |
| 2019/0031171 A1* | 1/2019 | Iwamoto | B60W 10/02 |
| 2019/0100207 A1* | 4/2019 | Maruyama | B60W 20/11 |

FOREIGN PATENT DOCUMENTS

| | | |
|---|---|---|
| EP | 2410158 A1 | 1/2012 |
| EP | 2420663 A1 | 2/2012 |
| EP | 2 578 871 A1 | 4/2013 |
| EP | 2 696 053 A1 | 2/2014 |
| GB | 2519158 A | 4/2015 |
| JP | 2010-242621 A | 10/2010 |
| WO | 2012/063389 A1 | 5/2012 |
| WO | 2016/014396 A1 | 1/2016 |

OTHER PUBLICATIONS

"Eco-Approach and Departure at Signalized Intersections: Preliminary Modeling Results," Fall/Winter Webinar Series, Nov. 20, 2013, U.S. Department of Transportation, 42 pages.

Gerty, M.D., et al., "Intermittent Restart for Automatic Engine Stop Start System," U.S. Appl. No. 15/341,320, filed Nov. 2, 2016.

"Investigating the Potential Benefits of Broadcasted Signal Phase and Timing (SPaT) Data Under IntelliDrive(SM)," Final Report, May 20, 2011, California PATH Program, Institute of Transportation Studies, University of California, Berkeley, 98 pages.

Notice of Allowance dated Dec. 6, 2017, issued in corresponding U.S. Appl. No. 15/341,320, filed Nov. 2, 2016, 5 pages.

International Search Report and Written Opinion dated Jan. 24, 2019, issued in corresponding International Application No. PCT/US2018/052726, filed Sep. 25, 2018, 9 pages.

Notice of Allowance dated Jun. 13, 2019, issued in U.S. Appl. No. 15/945,070, filed Apr. 4, 2018, 8 pages.

Notice of Allowance dated Jul. 9, 2019, issued in U.S. Appl. No. 15/975,616, filed May 9, 2018, 8 pages.

Govindswamy, K., et al., "Aspects of NVH Integration in Hybrid Vehicles," SAE International Journal of Passenger Cars—Mechanical Systems 2(1):1396-1405, 2009.

Ito, Y., et al., "Vibration-Reducing Motor Control for Hybrid Vehicles," R&D Review of Toyota CRDL 40(2):37-43, 2005.

\* cited by examiner

SYSTEMS AND METHODS FOR PREDICTIVE AND AUTOMATIC ENGINE STOP-START CONTROL

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a method of controlling a coast state of a vehicle is provided. A vehicle electronic control unit (VECU) monitors environment signals from one or more environmental sensors of the vehicle. The VECU determines whether the environment signals indicate a predicted coast opportunity. In response to determining that the environment signals indicate a predicted coast opportunity, the VECU transmits a signal to cause a powertrain of the vehicle to be opened, and determines whether vehicle state signals from one or more vehicle state sensors of the vehicle indicate a set of conditions for stopping an engine of the vehicle are met. In response to determining that the set of conditions for stopping the engine are met, the VECU transmits a signal to cause the engine to stop.

In some embodiments, a vehicle is provided. The vehicle comprises an engine, a powertrain, one or more vehicle state sensors, one or more environmental sensors, and a vehicle electronic control unit (VECU). The VECU is configured to monitor environment signals from the environmental sensors, and determine whether the environment signals indicate a predicted coast opportunity. In response to determining that the environment signals indicate a predicted coast opportunity, the VECU is configured to transmit a signal to cause the powertrain to be opened, and to determine whether vehicle state signals from the vehicle state sensors indicate a set of conditions for stopping the engine are met. In response to determining that the set of conditions for stopping the engine are met, the VECU is configured to transmit a signal to cause the engine to be stopped.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

In general, while operating internal combustion engines, efficiencies such as lower fuel consumption and reduced emissions can be gained by reducing engine speed. Engine speed can be reduced by disconnecting the drivetrain and running the engine at idle in situations where engine power is not needed to accelerate the vehicle. Efficiencies can also be gained by shutting the engine down completely. These efficiencies can be improved beyond what can be obtained by manual operation by taking into account sensor information that is not available to the operator to predict additional opportunities for both engine-on coasting and engine-off coasting/stopping.

In some embodiments of the present disclosure, sensors mounted on a vehicle can allow opportunities for coasting to be predicted based on environmental conditions, route planning information, and/or vehicle-to-vehicle or vehicle-to-infrastructure signaling. In some embodiments of the present disclosure, these sensors can also predict a need for power and/or an end of a coast opportunity. These predictions can allow the vehicle to automatically enter a coasting state, and can predictively re-engage the engine and/or powertrain in order to make power available with no delay when desired by the operator.

Figure 1:
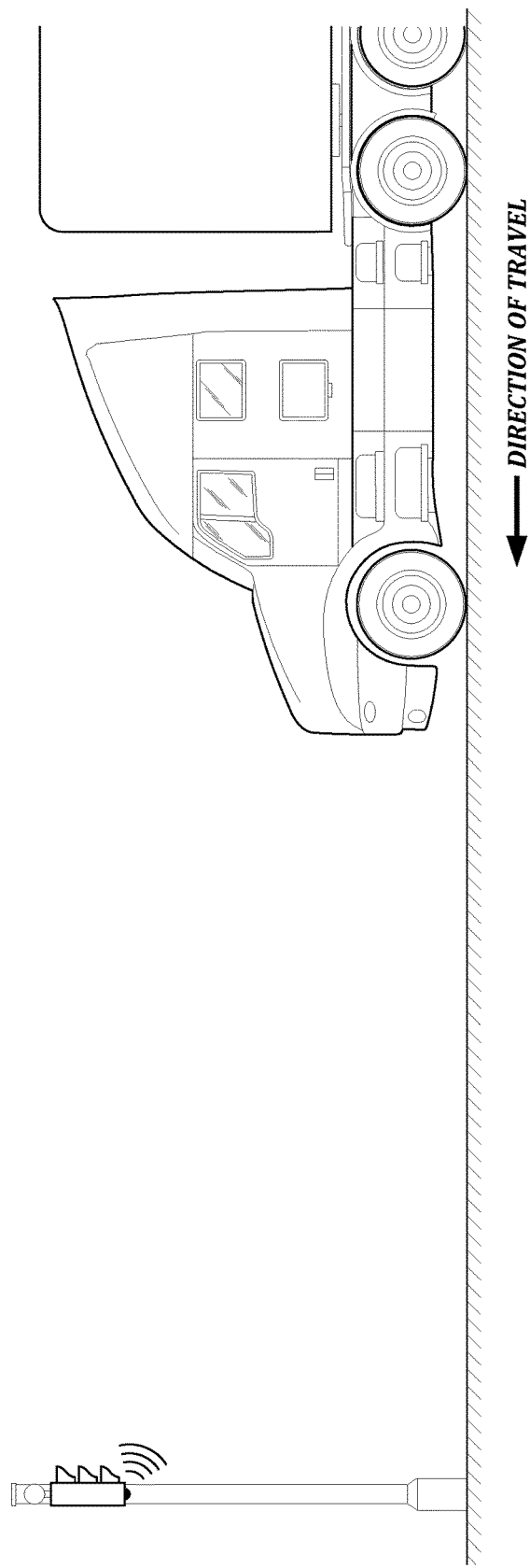
FIG. 1 is a schematic diagram that illustrates an example embodiment of a vehicle approaching a traffic control signal according to various aspects of the present disclosure.

FIG. 1 is a schematic diagram that illustrates an example embodiment of a vehicle approaching a traffic control signal according to various aspects of the present disclosure. As illustrated, the vehicle is traveling towards the traffic control signal. If the vehicle will need to stop at the traffic control signal, then the vehicle has an opportunity to coast to a stop. Depending on the state of the vehicle, a variety of different coasting techniques could be used. For example, if the vehicle is traveling at a high rate of speed and needs to apply additional braking power to come to a stop at the traffic control signal, the transmission may stay engaged in order to use engine drag to help slow the vehicle. If the vehicle is traveling at a lower rate of speed where engine braking would not be helpful, then the transmission may be disengaged in order to run the engine at a more efficient idle speed while the vehicle is decelerating. If the vehicle is traveling at a rate of speed that indicates that it will be decelerating for a long time, or if it can be determined that the vehicle will be stopped at the traffic control signal for a long period of time, the engine of the vehicle may be shut down in order to achieve even lower fuel consumption and lower emissions.

As illustrated, the traffic control signal may transmit wireless signals that indicate information regarding the state of the traffic control signal. The wireless signals may indicate signal phase and timing (SPAT) information as part of a vehicle-to-infrastructure (V2I) communication network. The vehicle can use these wireless signals to predict whether it will be able to travel through the traffic control signal without stopping, or whether a stop will be required. If the vehicle determines that a stop will be required, the vehicle can then determine whether entering a coast mode would be beneficial. The wireless signals may also be used to determine when to exit the coast mode.

Figure 2:
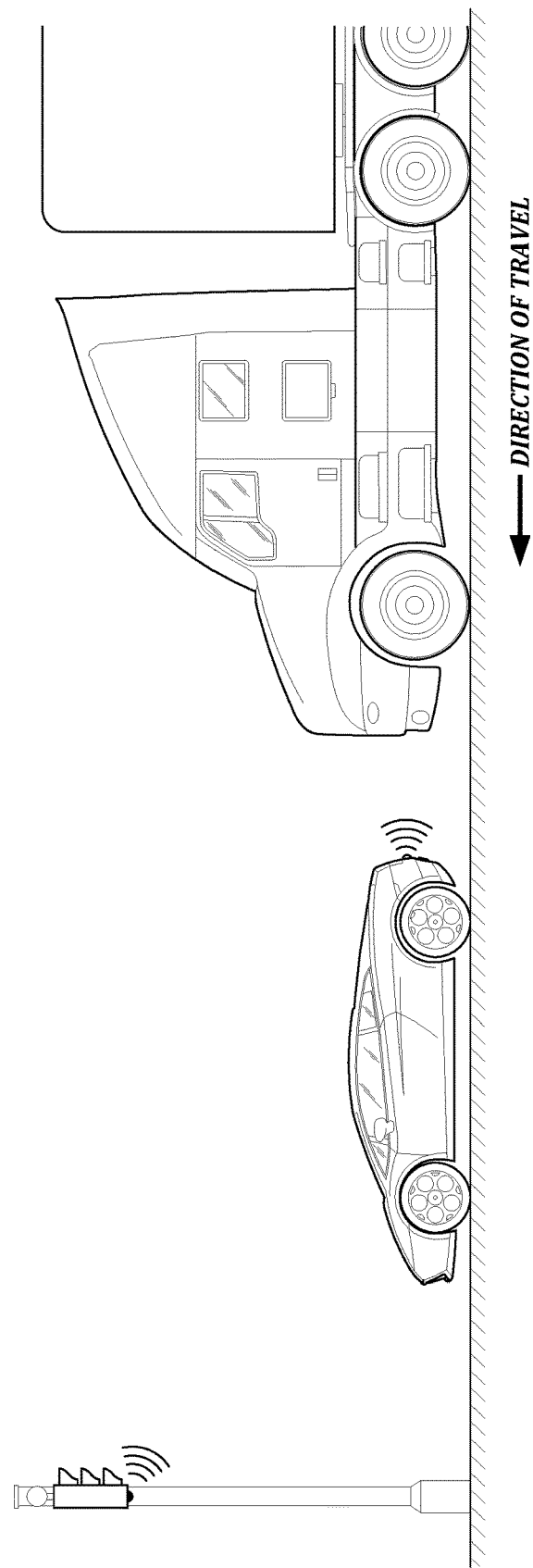
FIG. 2 is a schematic diagram that illustrates another example embodiment of a vehicle approaching a combination of obstacles according to various aspects of the present disclosure.

Of course, traffic control signals are not the only unpredictable obstacle that will cause a vehicle to have to stop. FIG. 2 is a schematic diagram that illustrates another example embodiment of a vehicle approaching a combination of obstacles according to various aspects of the present disclosure. While the vehicle in FIG. 2 is still approaching a traffic control signal, it is also following a lead vehicle. The travel of the vehicle will be impacted by the travel of the lead vehicle as well. For example, if the lead vehicle slows down or is stopped at the traffic control signal, the vehicle will have to wait for the lead vehicle to proceed regardless of the state of the traffic control signal. In some embodiments, the vehicle may process vehicle-to-vehicle (V2V) wireless messages from the lead vehicle to determine the size, position, speed, heading, acceleration, and brake system status of the lead vehicle. In some embodiments, the vehicle may determine relative speed, range, size, and other aspects of the lead vehicle using other environmental sensors of the vehicle, as described further below. The vehicle may then use the combination of information from the traffic control signal and the lead vehicle to determine when to enter and exit a coasting state.

Figure 3:
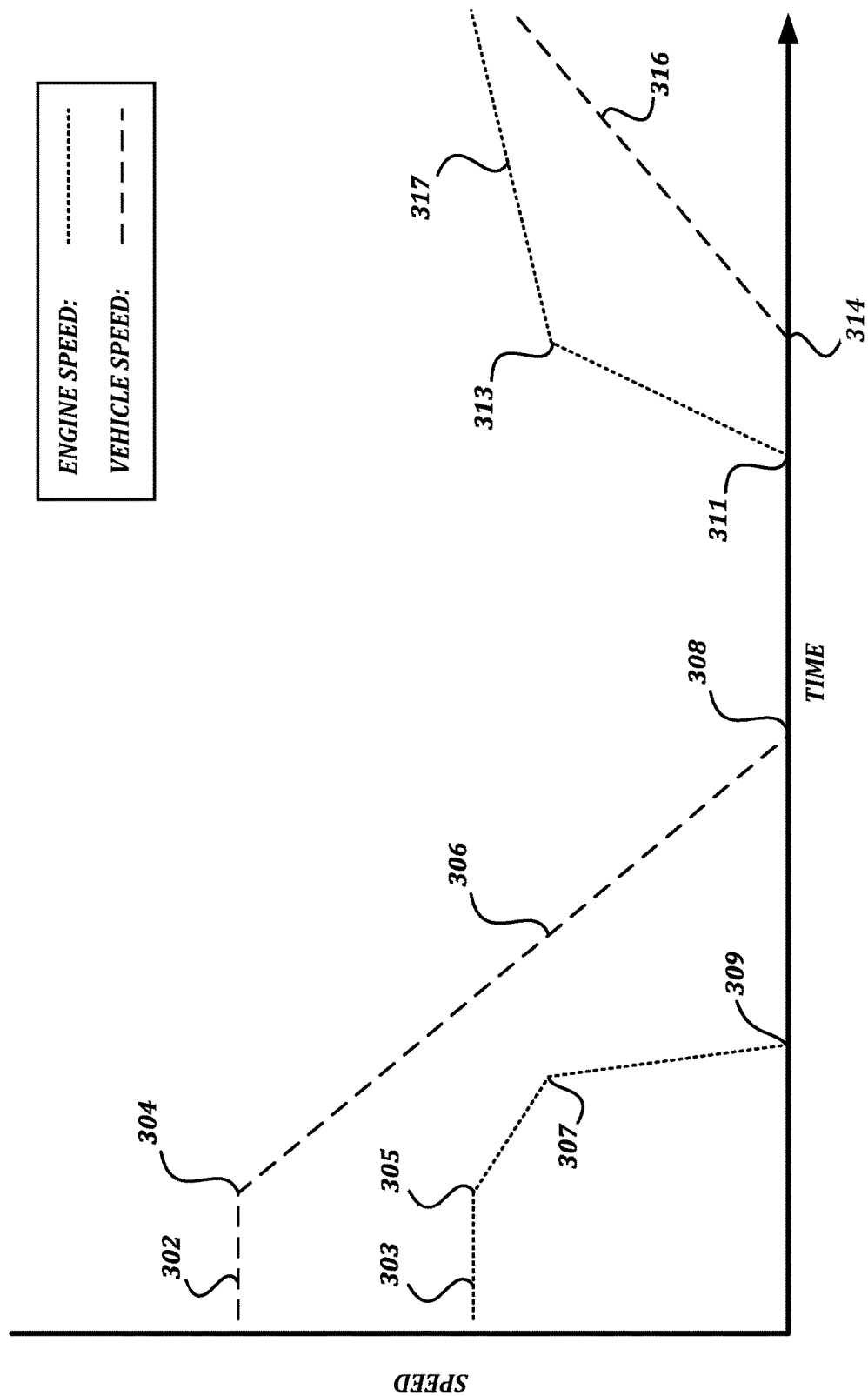
FIG. 3 is a chart that illustrates an example embodiment of variation in engine speed and vehicle speed over time according to various aspects of the present disclosure.

FIG. 3 is a chart that illustrates an example embodiment of variation in engine speed and vehicle speed over time according to various aspects of the present disclosure. In the illustrated chart, time progresses along the X-axis, and engine speed and vehicle speed are indicated on the Y-axis. To begin, the vehicle is cruising, with vehicle speed 302 and engine speed 303 remaining constant. At point 305, the engine speed begins to drop, as does vehicle speed at point 304. This may be due to an operator of the vehicle releasing an accelerator pedal, applying a brake, disengaging a transmission, or via any other suitable technique. The speed may begin to drop due to a manual action taken by the operator, or may occur automatically in response to determinations made based on the vehicle environment. For example, the vehicle may determine based on a predicted path and SPAT formation received from a traffic control signal that the vehicle will need to stop at the traffic control signal. Based on this prediction at point 305, the engine speed begins to approach an idle speed, and at point 304 the vehicle speed begins to fall.

At point 307, the vehicle may predict that the vehicle will be stopped for a long enough time for it to be more efficient to shut down the engine. Accordingly, at point 307, the vehicle begins to shut down the engine, and at point 309, the engine is in a stopped state. The vehicle speed continues to fall during region 306, as the vehicle coasts to a stop at point 308.

The vehicle then monitors the environmental conditions to predict when the engine should be restarted. For example, the vehicle may receive a SPAT signal from the traffic control signal indicating a future time when the signal will change, or a V2V signal from a lead vehicle indicating that a brake has been released and the lead vehicle is preparing to accelerate. The vehicle will then begin to restart the engine at point 311, in an attempt to have the engine fully restarted by point 313 when power is desired. In embodiments where information from the environmental sensors can allow the vehicle to predict a future time at which engine power will be needed, the point 311 when the restart process is started can be chosen such that the engine will be fully finished restarting at substantially the same time that power is desired, even if the restart process takes a significant amount of time. At point 313, the operator may request power to accelerate the vehicle, and the vehicle speed therefore begins to rise at point 314. The vehicle speed 316 and engine speed 317 then rise together as during normal operation.

Figure 4:
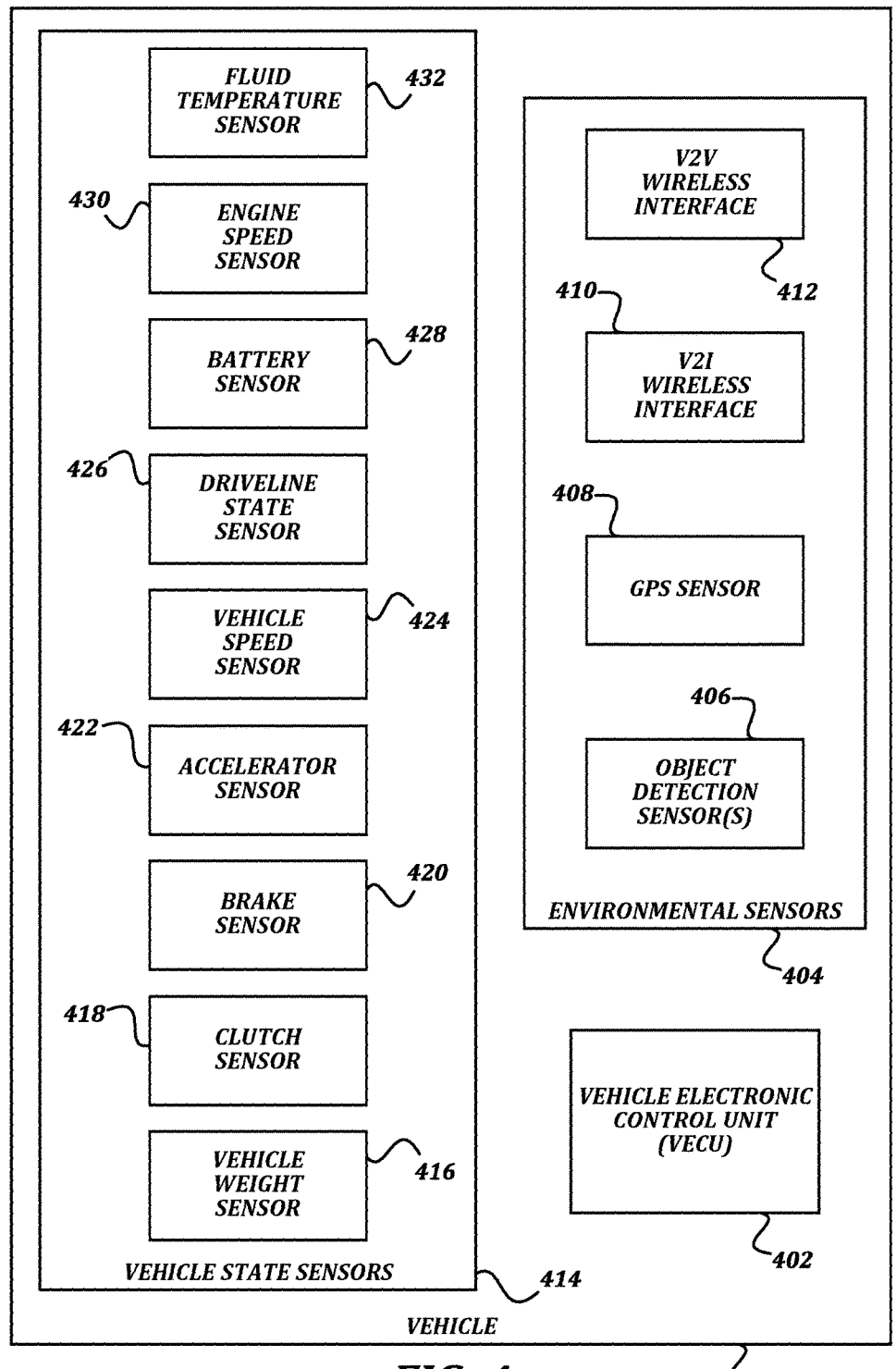
FIG. 4 is a block diagram that illustrates an example embodiment of a vehicle according to various aspects of the present disclosure.

FIG. 4 is a block diagram that illustrates an example embodiment of a vehicle according to various aspects of the present disclosure. In some embodiments, the vehicle 400 is a Class 8 truck, though in some embodiments other types vehicles could be used. As illustrated, the vehicle 400 includes a set of vehicle state sensors 414, a set of environmental sensors 404, and a vehicle electronic control unit (VECU) 402. The vehicle 400 also includes other elements that are known to one of ordinary skill in the art, including but not limited to an engine, a transmission, and a communication bus such as a CAN bus that allows communication between components of the vehicle 400. Because these elements are well known, they are not illustrated or described further herein for the sake of brevity.

In some embodiments, the vehicle state sensors 414 monitor conditions of various components of the vehicle 400 itself. As illustrated, the vehicle state sensors 414 include a coolant temperature sensor 432, an engine speed sensor 430, a battery sensor 428, a driveline state sensor 426, a vehicle speed sensor 424, an accelerator sensor 422, a brake sensor 420, a clutch sensor 418, and a vehicle weight sensor 416. Though particular vehicle state sensors 414 are described herein, the description should not be seen as limiting. One of ordinary skill in the art will understand that any other type of sensor that provides information about the vehicle 400 may be used as a vehicle state sensor 414. In some embodiments, some of the illustrated vehicle state sensors 414 may be omitted from the vehicle 400.

In some embodiments, the fluid temperature sensor 432 is configured to determine the temperature of a fluid used within the vehicle 400. For example, an oil temperature sensor may determine a temperature of lubricating oil used by the engine. As another example, a coolant temperature sensor may determine a temperature of a coolant circulated through the engine and a radiator in order to control the temperature of the engine. As yet another example, a urea temperature sensor may determine a temperature of urea used to treat an exhaust of the vehicle. In some embodiments, other fluid temperature sensors 432 may be present. In some embodiments, more than one fluid temperature sensor 432 may be present, for measuring temperature of more than one type of fluid.

In some embodiments, the engine speed sensor 430 is configured to determine a rotational (or other) speed at which the engine is operating. In some embodiments, values produced by the engine speed sensor 430 may be provided to other components of the vehicle 400 by an engine electronic control unit (ECU). In some embodiments, the engine speed sensor 430 may include an encoder or other device that physically measures the speed of an output shaft of the engine.

In some embodiments, the battery sensor 428 is configured to measure a level of charge of a battery of the vehicle 400. One or more batteries may be present in the vehicle 400, and each battery may be associated with a separate battery sensor 428. In some embodiments, the battery may be used to provide power to a starter motor, and/or may be used to provide power to other vehicle systems (including but not limited to power steering, power brakes, electrical systems, and HVAC systems) while the engine is not running.

In some embodiments, the driveline state sensor 426 is configured to monitor a state of the driveline. For example, the driveline state sensor 426 may detect whether a clutch of the vehicle 400 is engaged or disengaged. As another example, the driveline state sensor 426 may determine a gear ratio being used by a transmission of the vehicle 400. In some embodiments, the driveline state sensor 426 may detect these states as reported by the relevant components (e.g., a clutch engaged/disengaged signal reported by the clutch, or a gear ratio reported by the transmission). In some embodiments, the driveline state sensor 426 may derive these states by comparing an output shaft speed of the engine to an output shaft speed of the transmission.

In some embodiments, the vehicle speed sensor 424 is configured to determine a speed at which the vehicle 400 is traveling along the road. The vehicle speed sensor 424 may use any suitable technique for determining vehicle speed. For example, the vehicle speed sensor 424 may detect a speed reported by a wheel speed sensor to determine the vehicle speed. As another example, the vehicle speed sensor 424 may use a speed reported by a traction control system or anti-lock braking system. As yet another example, the vehicle speed sensor 424 may derive the speed at which the vehicle 400 is traveling along the road from other signals, such as by using the engine speed and the gear ratio, or by using locations reported by the GPS sensor 408.

In some embodiments, the accelerator sensor 422 is configured to detect a position of an accelerator pedal and to generate a signal indicating the position of the accelerator pedal. In some embodiments, the accelerator sensor 422 may convert the position of the accelerator pedal into a torque request and may provide a signal indicating the amount of torque requested by the operator via the pedal.

In some embodiments, the brake sensor 420 is configured to detect a position of a brake pedal and to generate a signal indicating the position of the brake pedal. In some embodiments, instead of directly measuring the position of the brake pedal, the brake sensor 420 may detect an amount of braking force being applied by friction brakes and/or any other braking mechanisms including but not limited to magnetic brakes, retarders, exhaust brakes, and engine brakes.

In some embodiments, the clutch sensor 418 is configured to detect a state of a clutch of the transmission, and to generate a signal indicating whether the clutch is engaged or disengaged. In some embodiments, the clutch sensor 418 may sense the state of the clutch directly from the components of the clutch using a physical sensor. In some embodiments, the clutch sensor 418 may derive the state of the clutch based on a speed of an output shaft of the engine and a speed of an output shaft of the transmission.

In some embodiments, the vehicle weight sensor 416 is configured to determine a weight of the vehicle 400, and to generate a signal indicating the determined weight. In some embodiments, the vehicle weight sensor 416 may detect an amount of stress on a vehicle component, including but not limited to a wheel, an axle, a suspension component, or a fifth-wheel coupling, and may derive the weight of the vehicle 400 from the information obtained. In some embodiments, the vehicle weight sensor 416 may derive a weight of the vehicle based on other information, including but not limited to an amount of torque being produced by the engine, a transmission gear ratio, and a resulting vehicle speed. In some embodiments, the vehicle weight sensor 416 may detect a weight value that is wirelessly transmitted to the vehicle 400 by an external scale. In some embodiments, the vehicle weight sensor 416 may retrieve a weight value that is manually entered by the operator of the vehicle 400.

In some embodiments, the environmental sensors 404 monitor conditions surrounding the vehicle 400 that may impact the vehicle 400 or its performance. As illustrated, the environmental sensors 404 include a vehicle-to-vehicle (V2V) wireless interface 412, a vehicle-to-infrastructure (V2I) wireless interface 410, a global positioning system (GPS) sensor 408, and one or more object detection sensors 406. Though particular environmental sensors 404 are described above, the description should not be seen as limiting. One of ordinary skill in the art will understand that any other type of sensor that provides information about the environment around the vehicle 400 may be used as an environmental sensor 404. In some embodiments, one or more of the environmental sensors 404 may be omitted from the vehicle 400.

In some embodiments, the vehicle-to-vehicle (V2V) wireless interface 412 is configured to receive wireless communication signals from other vehicles, and may also be configured to transmit wireless communication signals to other vehicles. In some embodiments, the V2V wireless interface 412 may include a transceiver configured to receive dedicated short-range communications (DSRC) signals from other vehicles. In some embodiments, these signals may be within the 5.9 GHz spectrum. In some embodiments, the V2V signals received by the V2V wireless interface 412 may include basic safety messages (BSMs) that provide vehicle dynamics information including one or more of a heading, a speed, a location, and a braking status of a transmitting vehicle. In some embodiments, the V2V wireless interface 412 may be configured to receive or transmit information from or to other vehicles via some other spectrum or networking technique, including but not limited to Wi-Fi, 4G, LTE, and satellite communications.

In some embodiments, the V2I wireless interface 410 is configured to receive wireless communication signals from infrastructure equipment, and may also be configured to transmit wireless communication signals to infrastructure equipment. In some embodiments, the V2I wireless interface 410 may operate using similar techniques as the V2V wireless interface 412, including receiving DSRC signals from infrastructure equipment within the 5.9 GHz spectrum. In some embodiments, the infrastructure equipment may include equipment associated with traffic control devices, and the wireless communication signals received by the V2I wireless interface 410 may include signal phase and timing (SPaT) information that provides information regarding when and for how long the traffic control signal will be in a given state (e.g., "the signal will be red for ten more seconds"). In some embodiments, the V2I wireless interface 410 may be configured to transmit information about the vehicle 400 to infrastructure equipment to enable functionality such as eco-freight signal priority. In some embodiments, the V2I wireless interface 410 may be configured to receive or transmit information from or to infrastructure devices via some other spectrum or networking technique, including but not limited to Wi-Fi, 4G, LTE, and satellite communications.

In some embodiments, the GPS sensor 408 is configured to receive signals from GPS satellites, and to determine a position of the vehicle 400 based on the signals. In some embodiments, the GPS sensor 408 may be capable of using other positioning technologies instead of or in addition to satellite communication, including but not limited to using cellular signal transmissions, using Wi-Fi signals, and using WiMAX signals.

In some embodiments, the object detection sensors 406 are configured to detect objects near the vehicle 400. Any type of sensor that can detect objects may be used. One example of an object detection sensor 406 is a LIDAR sensor that uses a laser to scan an area around the vehicle 400 and build a three-dimensional representation of any objects within the area. Another example of an object detection sensor 406 is one or more video cameras coupled to a computer vision system that is configured to detect objects within the video data generated by the video cameras. Yet another example of an object detection sensor 406 is a radar or ultrasonic sensor, which may be more suitable for detecting objects within close range of the vehicle 400 than a LIDAR sensor or a video camera sensor. In some embodiments, other types devices may be used as object detection sensors 406.

In some embodiments, the vehicle electronic control unit (VECU) 402 is an ECU computing device that is configured to receive signals from the vehicle state sensors 414 and the environmental sensors 404, to determine an appropriate state for the transmission and the engine based on the received signals, and to transmit control signals to an engine ECU and a transmission ECU in order to place the transmission and engine in the appropriate state. Further details of the actions performed by the VECU 402 and the determinations made by the VECU 402 are provided below.

The various electronic components illustrated in FIG. 4 may communicate with each other through a vehicle-wide communications network (not shown). Those skilled in the art and others will recognize that the vehicle-wide communications network may be implemented using any number of different communication protocols such as, but not limited to, Society of Automotive Engineers' ("SAE") J1587, SAE J1922, SAE J1939, SAE J1708, and combinations thereof.

Figure 5A:
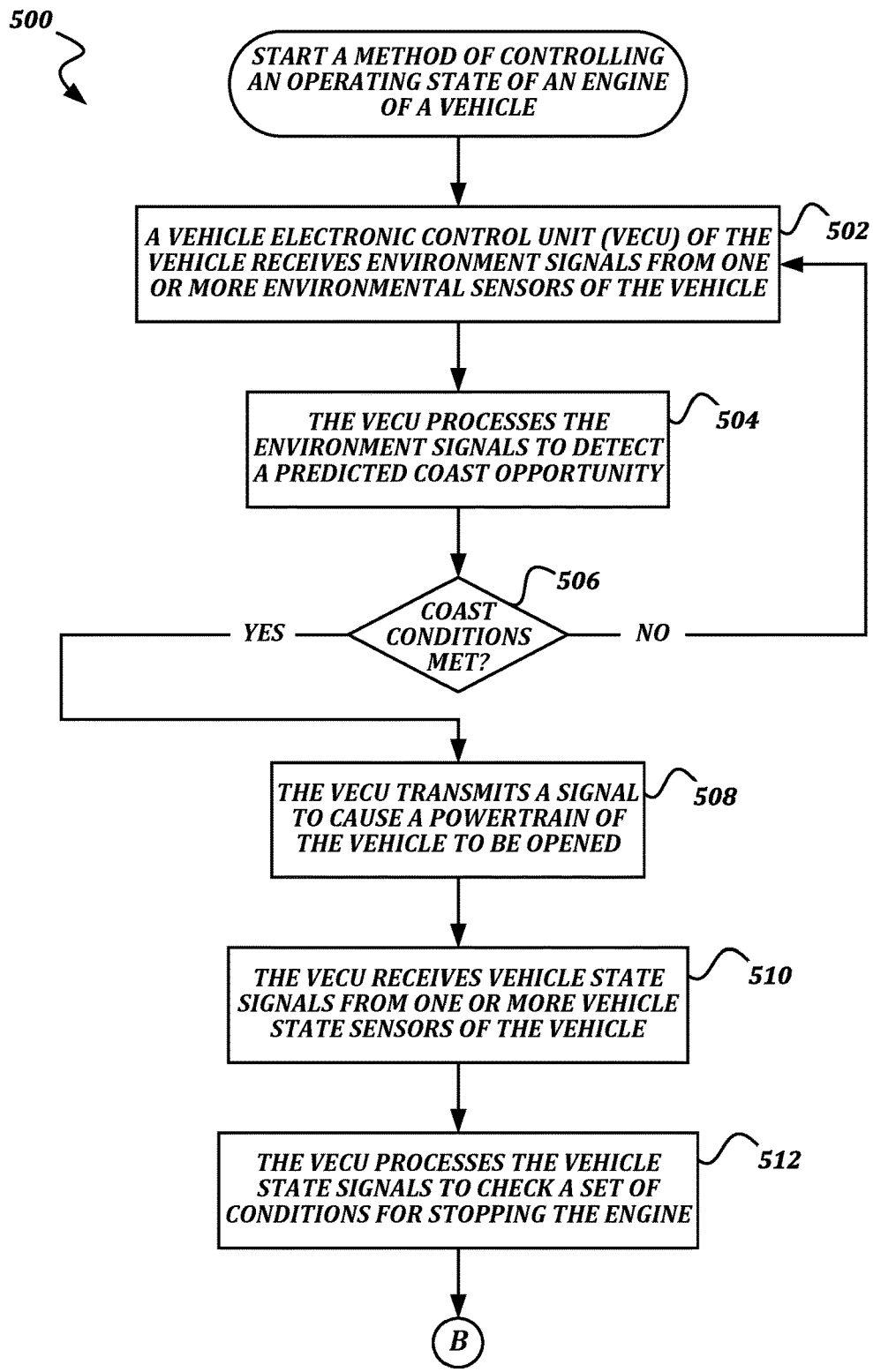
FIGS. 5A-5B are a flowchart that illustrates an example embodiment of a method of controlling an operating state of an engine of a vehicle according to various aspects of the present disclosure.
Figure 5B:
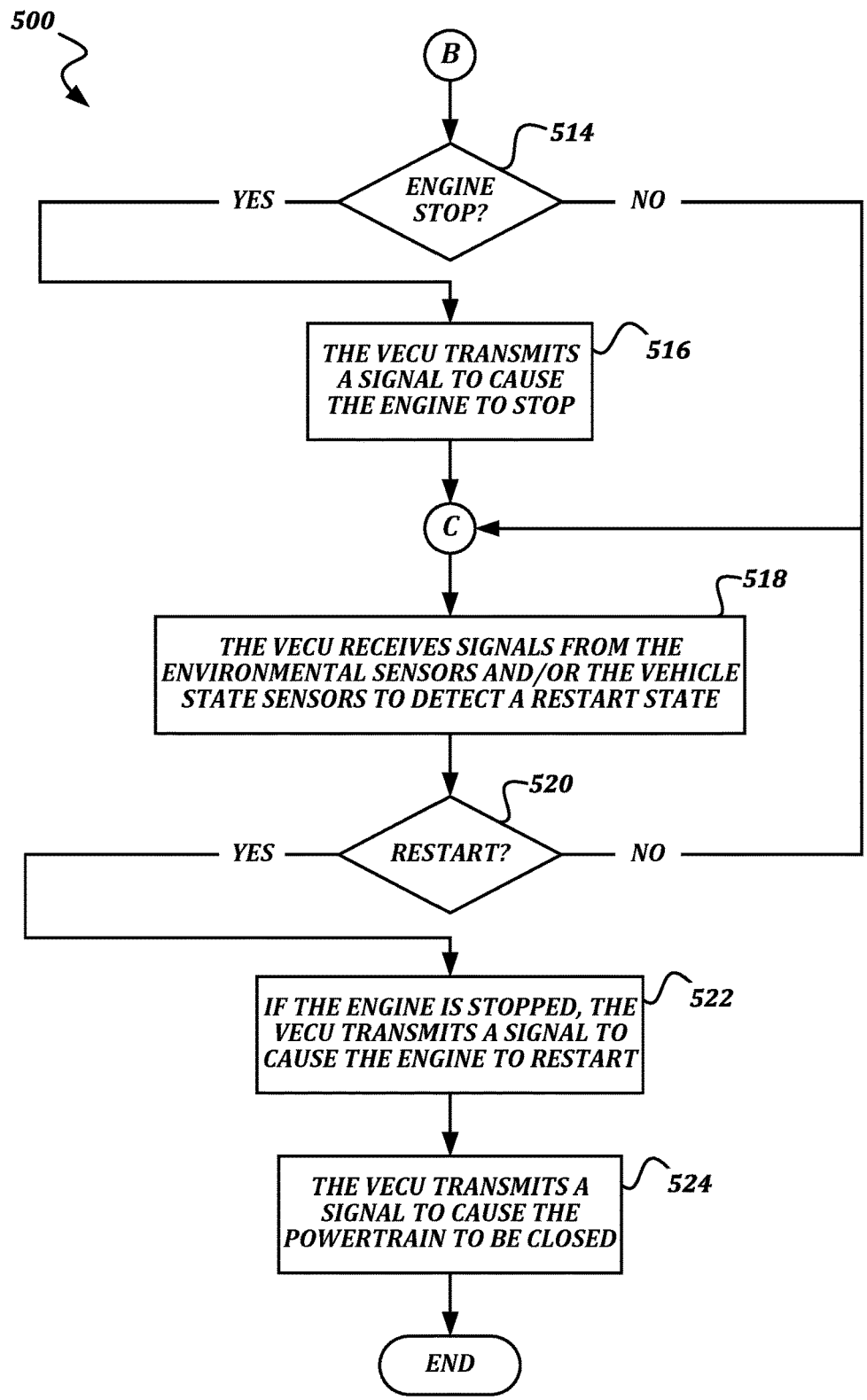

FIGS. 5A-5B are a flowchart that illustrates an example embodiment of a method of controlling an operating state of an engine of a vehicle according to various aspects of the present disclosure. From a start block, the method 500 proceeds to block 502, where a vehicle electronic control unit (VECU) 402 of the vehicle 400 receives environment signals from one or more environmental sensors 404 of the vehicle 400. At block 504, the VECU 402 processes the environment signals to detect a predicted coast opportunity.

In some embodiments, a predicted coast opportunity is a state wherein it is predicted that the vehicle 400 will not be supplying forward power to the drivetrain. This may be because the vehicle 400 is predicted to slow down, is predicted to stop, or is predicted to maintain speed without engine power (such as while traversing a downhill grade). The VECU 402 may examine any type of signal produced by the environmental sensors 404 in order to predict that the vehicle 400 will slow down, stop, or maintain speed without engine power for any reason.

As one example, the VECU 402 may receive a signal from the V2V wireless interface 412 that indicates that the vehicle 400 is likely to have to slow down or stop. For example, the V2V wireless interface 412 may receive a wireless transmission from a lead vehicle in front of the vehicle 400, wherein the wireless transmission indicates that the lead vehicle is applying brakes, is slowing down, or will otherwise become an obstacle in front of the vehicle 400. The VECU 402 may then determine, based on a range between the vehicle 400 and the lead vehicle along with the information received in the wireless transmission, how much the vehicle 400 will have to slow down (or where the vehicle 400 will have to stop), and may use that determination to detect a predicted coast opportunity.

As another example, the VECU 402 may receive a signal from the V2I wireless interface 410 that indicates the vehicle 400 should slow down or stop. For example, a transmitter associated with a traffic control signal may send a wireless transmission indicating a state of the traffic control signal, including but not limited to the current state, a future state, and/or how long the current state and/or future state will remain active. The VECU 402 may use this information, along with the distance between the vehicle 400 and the point where it would have to stop, to determine whether a predicted coast opportunity exists. If the VECU 402 determines that the vehicle 400 will have to stop at the traffic control signal based on the signal timing and the current vehicle speed, then it is likely that a predicted coast opportunity exists. The VECU 402 may also determine that a predicted coast opportunity exists if, by reducing vehicle speed, the vehicle 400 will reach the traffic control signal at a point when the vehicle 400 will not have to stop. As another example, the V2I wireless interface 410 may receive a wireless transmission that indicates a speed at which the vehicle 400 may travel in order to increase the likelihood of reaching the traffic control signal at a time when it will not cause the vehicle 400 to stop, in which case a predicted coast opportunity may be determined in order to lower the vehicle speed to the speed indicated by the wireless signal. The wireless transmissions may also indicate whether the traffic control signal timing may be altered by a signal from the V2I wireless interface 410, such as is used to provide eco-freight signal priority, and the VECU 402 may take the availability of eco-freight signal priority into account when determining whether a predicted coast opportunity is present.

As another example, the VECU 402 may receive a signal from the GPS sensor 408 that indicates that the vehicle 400 is likely to have to slow down, stop, or will otherwise not need the engine to power the vehicle 400 to maintain speed. For example, the GPS sensor 408 may transmit a signal that, along with a predicted vehicle path from the GPS sensor 408 or other component, indicates that the vehicle 400 is approaching a turn or a curve in the road for which the vehicle 400 will need to reduce its speed in order to successfully navigate the turn or curve, or a stop sign or railroad crossing at which the vehicle 400 should stop. As another example, the GPS sensor 408 may transmit a signal that, along with a predicted vehicle path from the GPS sensor 408 or other component, indicates that the vehicle 400 will be traversing a sufficient downhill grade to maintain the speed of the vehicle 400 without power being supplied from the engine. As still another example, the GPS sensor 408 may transmit a signal that, along with a predicted vehicle path from the GPS sensor 408 or other component, indicates that the vehicle 400 will be approaching a stretch of road with a lower speed limit than the current stretch of road, and that the vehicle 400 will therefore have to slow down to remain in compliance. In some embodiments, other information may be obtained from the GPS sensor 408 that can be used by the VECU 402 to determine that the vehicle 400 is likely to slow down or stop.

As another example, the VECU 402 may receive a signal from an object detection sensor 406 that indicates that the vehicle 400 is likely to have to slow down or stop due to an obstruction in the roadway. For example, a LIDAR, radar, ultrasonic sensor, or a computer vision system may detect a pedestrian, a rock, a stopped vehicle, or another object within the roadway and the potential path of the vehicle 400. This may commonly occur at intersections, where an object detection sensor 406 may either detect a lead vehicle stopped in front of the vehicle 400 (and so the vehicle 400 would have to stop regardless of the state of the traffic control signal), or vehicles or pedestrians that constitute crossing traffic (and so the vehicle 400 would have to stop to avoid a collision).

As still another example, the VECU 402 may determine a predicted coast opportunity is present using a combination of signals from the environmental sensors 404. As one non-limiting example, the VECU 402 may receive signal timing information via the V2I wireless interface 410, and may combine the signal timing information with information from the object detection sensors 406 and/or V2V wireless interface 412 to determine how long it will take after the traffic control signal changes for the lead vehicles to clear the intersection before the vehicle 400 can proceed. As another non-limiting example, the VECU 402 may use a predicted path and location from the GPS sensor 408 along with object information from the object detection sensor 406 to determine whether a detected object will actually be within the predicted path of the vehicle 400, or whether the detected object can be ignored.

Next, at decision block 506, a determination is made regarding whether a set of coast conditions are met based on the environment signals. In some embodiments, any opportunity for the vehicle 400 to travel without forward power being applied by the engine may be considered as meeting the set of coast conditions. In some embodiments, the VECU 402 may check a coast condition related to how long the coast opportunity is predicted to persist. As an example, this coast condition may be met if the coast opportunity is predicted to persist for a long enough time for the engine to be completely shut down and restarted before power is again needed. As another example, this coast condition may be met if the coast opportunity is predicted to persist for a long enough time for the engine to be shut down for long enough such that the fuel savings and emissions reductions gained for doing so outbalance a drop in fuel efficiency and/or emissions cleanliness during the startup and shutdown process. In some embodiments, checking a coast condition may include determining how quickly the vehicle 400 is likely to decelerate, and may be met if engine drag or engine braking force does not need to be used to provide the predicted deceleration. In some embodiments, checking a coast condition may include checking signals from the V2V wireless interface 412 or the V2I wireless interface 410 to determine whether any signals report that an emergency vehicle is approaching, and the coast condition may not be met if any emergency vehicles are approaching.

If the set of coast conditions are met, then the result of decision block 506 is YES, and the method 500 proceeds to block 508. Otherwise, if one or more of the coast conditions are not met, then the result of decision block 506 is NO, and the method 500 returns to block 502 to receive more environment signals and to detect a subsequent predicted coast opportunity.

At block 508, the VECU 402 transmits a signal to cause a powertrain of the vehicle 400 to be opened. In some embodiments, the signal transmitted by the VECU 402 may be sent to the transmission or transmission controller, and may cause the transmission to automatically disengage its clutch or to automatically shift the transmission into neutral, thus automatically entering the coasting state. In some embodiments, the signal transmitted by the VECU 402 may cause a coast instruction or indicator to be presented to an operator of the vehicle 400 in order to cause the operator to manually disengage the clutch or shift the transmission into neutral. Once the powertrain is opened, the vehicle 400 is in an "engine-on" coasting state.

At block 510, the VECU 402 receives vehicle state signals from one or more vehicle state sensors 414 of the vehicle 400. The vehicle state signals allow the VECU 402 to determine whether the vehicle 400 is in a state in which the engine may be shut down in order to enter an "engine-off" coasting state. At block 512, the VECU 402 processes the vehicle state signals to check a set of conditions for stopping the engine. For example, a fluid temperature sensor 432 such as an oil temperature sensor may provide a signal indicating an oil temperature. It may be desirable to keep the engine running until the oil temperature reaches an optimum temperature range. As such, a condition for stopping the engine may be that the oil temperature (as reported by the fluid temperature sensor 432) is within the optimum temperature range. As another example, a battery sensor 428 may report a state of charge of a battery. Because the battery may be used to power vehicle systems when the engine is off, and the engine is used to charge the battery, a condition for stopping the engine may be that the state of charge of the battery is greater than a threshold amount of charge, given an expected load to be placed on the battery and a duration for which the load will be applied. As still another example, the vehicle speed sensor 424 may report a vehicle speed value, and shut down may be limited to situations where the vehicle speed value is below a high speed threshold. Likewise, the engine speed sensor 430 may report an engine speed value, and shut down may be limited to situations where the engine speed value is below an engine speed threshold. Yet another example, which is not illustrated in FIG. 4, is a back pressure or temperature sensor that detects when an after-treatment regeneration system should be activated. Because the engine is used in the regeneration process, a condition for stopping the engine may be that the sensors do not indicate a need for regeneration.

The method 500 then proceeds to a continuation terminal ("terminal B"), and from terminal B (FIG. 5B) to decision block 514, where a determination is made regarding whether the engine should be stopped. This determination is based on the set of conditions checked in block 512. Typically, the determination is based on whether or not all of the conditions in the set of conditions are met. In some embodiments, the determination may be based on whether one or more of the conditions in the set of conditions are met. If the determination is made that the engine should be stopped, then the result of decision block 514 is YES, and the method 500 proceeds to block 516, where the VECU 402 transmits a signal to cause the engine to stop. The signal may be transmitted by the VECU 402 to an engine ECU or other device responsible for controlling operation of the engine. In some embodiments, the signal may set a torque target or an engine speed target of zero in order to cause the engine to stop. In some embodiments, the signal may be a shutdown command that initiates the shutdown process. In some embodiments, the signal may cause a decompression device to be activated in order to reduce engine vibration during shutdown and to reduce load on the starter during restart. Use of a decompression device is described in commonly owned, co-pending U.S. application Ser. No. 15/341,320, filed Nov. 2, 2016, the entire disclosure of which is hereby incorporated by reference for all purposes.

The method 500 then proceeds to a continuation terminal ("terminal C"). Otherwise, if the determination is made that the engine should not be stopped, then the result of decision block 514 is NO, and the method 500 proceeds directly to terminal C. From terminal C, the method 500 proceeds to block 518, where the VECU 402 receives one or more signals from the environmental sensors 404 and/or the vehicle state sensors 414 to detect a restart state.

In some embodiments, the restart state may be a state wherein a vehicle state sensor 414 detects that torque is requested from the engine, including but not limited to a signal from the accelerator sensor 422 indicating that the accelerator has been pressed. In some embodiments, another type of control input from the operator, including but not limited to wiggling the steering wheel, pressing a button on the dashboard, and shifting the transmission from neutral to a drive gear, may indicate the presence of a restart state. In some embodiments, a restart state may be detected when a vehicle state sensor 414 indicates that a coast condition is no longer valid. For example, if a coast condition requires a minimum state of charge of the battery to be reported by the battery sensor 428 and a subsequent signal from the battery sensor 428 indicates that the state of charge has fallen below this minimum amount, then a restart state may be detected. Likewise, if a coast condition requires that a temperature reported by a fluid temperature sensor 432 be maintained within an optimum range and the temperature falls below that range, then a restart state may be detected.

In some embodiments, the restart state may be a state wherein an environmental sensor 404 detects that the vehicle 400 should be able to accelerate, either immediately or at a predicted point in the future. For example, the V2I wireless interface 410 may receive a wireless transmission from a traffic control signal that indicates that the traffic control signal will allow the vehicle 400 to proceed in five seconds. The VECU 402 may use this information to determine that a restart state will be present five seconds in the future. The VECU 402 may also determine that the restart state will be present sooner than the point indicated by the V2I wireless interface 410 by an amount of time it will take the engine to restart so that power is available as soon as the restart state exists. For example, if it takes three seconds for the engine to restart and the traffic control signal will change in five seconds, then the VECU 402 may determine that a restart state will be present two seconds into the future. As another example, the VECU 402 may receive a location signal from the GPS sensor 408 and determine that a curve along the projected path will be straightening out, a downhill grade will be ending, a speed limit will be rising, or other path conditions exist that will require engine power to accelerate the vehicle 400. As yet another example, the VECU 402 may receive a signal from the V2V wireless interface 412 indicating that a lead vehicle is accelerating, from which the VECU 402 may determine that a restart state is present because the lead vehicle will soon be out of the way. As still another example, the VECU 402 may receive a signal from the object detection sensors 406, and may determine that a restart state is present because an obstacle in the roadway has been moved or cross traffic is clear.

At decision block 520, a determination is made regarding whether the signals from the environmental sensors 404 and/or the vehicle state sensors 414 indicate a restart condition. If a restart condition exists, then the result of decision block 520 is YES, and the method 500 proceeds to block 522. Otherwise, if a restart condition does not exist, then the result of decision block 520 is NO, and the method 500 returns to terminal C to check again for a restart condition.

At block 522, if the engine is stopped, the VECU 402 transmits a signal to cause the engine to restart. The signal may be a command to restart the engine, a torque request or an engine speed request that is greater than zero, a command to engage or disengage a decompression device, or may be any other signal that causes the engine to restart.

At block 524, the VECU 402 transmits a signal to cause the powertrain to be closed. In some embodiments, the signal is a command sent directly to the transmission or transmission controller to cause the powertrain to be closed. If the engine was running before block 522, then the overall actions of the process between block 508 and block 524 will be to automatically open the powertrain to coast, and then to automatically close the powertrain to stop coasting. In some embodiments, the signal causes an indication to be presented to the operator of the vehicle 400 to close the powertrain, and the operator may take actions accordingly.

In some embodiments, the signal at block 524 may not be transmitted directly after the engine is restarted at block 522. For example, coast conditions relating to a downhill grade, a stop, and/or the like may continue to be met while a restart state is detected related to something other than accelerating the vehicle 400, including but not limited to a temperature threshold, a battery charge state, and a regeneration process. In such embodiments, the VECU 402 may not transmit the signal that causes the powertrain to be closed until after a coast condition relating to accelerating the vehicle is no longer met or the VECU 402 otherwise detects a demand for acceleration.

The method 500 then proceeds to an end block and terminates.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method of controlling a coast state of a vehicle, the method comprising:
    monitoring, by a vehicle electronic control unit (VECU), environment signals from one or more environmental sensors of the vehicle;
    determining, by the VECU, whether the environment signals indicate a predicted coast opportunity; and
    in response to determining that the environment signals indicate a predicted coast opportunity:
       transmitting, by the VECU, a signal to cause a powertrain of the vehicle to be opened;
       determining, by the VECU, whether vehicle state signals from one or more vehicle state sensors of the vehicle indicate a set of conditions for stopping an engine of the vehicle are met;
       in response to determining that the set of conditions for stopping the engine are met, transmitting, by the VECU, a signal to cause the engine to stop;
       monitoring, by the VECU, the environment signals and the vehicle state signals to predict a time when engine power will be needed, including at least one of:
          receiving, by a vehicle-to-infrastructure (V2I) wireless interface of the vehicle, a signal indicating a time when a traffic control signal will change to allow the vehicle to proceed; and
          receiving, by a vehicle-to-vehicle (V2V) wireless interface of the vehicle, a signal indicating a lead vehicle is accelerating; and
       transmitting, by the VECU, a signal to cause the engine to restart based on the predicted time when engine power will be needed.

2. The method of claim 1, wherein transmitting the signal to cause the engine to restart based on the predicted time when engine power will be needed includes transmitting the signal to cause the engine to restart at a time that is earlier than the time when the traffic control signal will change by an amount of time that restart of the engine will take.

3. The method of claim 1, wherein the predicted coast opportunity is a predicted stop of the vehicle.

4. The method of claim 3, wherein the predicted stop is a traffic control signal for which a signal received by a V2I wireless interface of the vehicle indicates will be red at a predicted arrival time of the vehicle.

5. The method of claim 3, wherein the predicted stop is caused by an object in the path of the vehicle, a railroad crossing, a stop sign, or a predicted turn of the vehicle.

6. The method of claim 1, wherein determining whether vehicle state signals from one or more vehicle state sensors of the vehicle indicate a set of conditions for stopping an engine of the vehicle are met includes predicting a time period for which the engine will be stopped, and comparing the time period to a threshold time period for which fuel savings from shutdown outweigh a fuel cost of stopping and restarting the engine.

7. The method of claim 6, wherein predicting a time period for which the engine will be stopped includes predicting how long it will take one or more lead vehicles between the vehicle and the traffic light to start moving after the traffic control signal changes.

8. The method of claim 1, wherein the set of conditions for stopping the engine of the vehicle includes one or more of:
an engine coolant temperature being between a low temperature threshold and a high temperature threshold;
a vehicle speed being below a high speed threshold;
an engine speed being below an engine speed threshold;
a battery state of charge being above a battery charge threshold; and
an after-treatment regeneration system being inactive.

9. The method of claim 1, wherein the predicted coast opportunity is an upcoming downhill grade, an upcoming speed limit reduction, or an upcoming road curve.

10. The method of claim 1, further comprising, in response to determining that the set of conditions for stopping the engine are met:
transmitting, by the VECU, a signal to cause a decompression device to be activated.

11. The method of claim 1, wherein determining whether the environment signals indicate a predicted coast opportunity includes detecting a lack of signals received by a V2I wireless interface or a V2V wireless interface of the vehicle indicating that an emergency vehicle is approaching.

12. The method of claim 1, wherein determining whether the environment signals indicate a predicted coast opportunity includes:
determining how quickly the vehicle is likely to decelerate; and
determining whether engine drag or engine braking force should be used to provide the predicted deceleration.

13. A vehicle, comprising:
an engine;
a powertrain;
one or more vehicle state sensors;
one or more environmental sensors, including at least one of a vehicle-to-infrastructure (V2I) wireless interface and a vehicle-to-vehicle (V2V) wireless interface; and
a vehicle electronic control unit (VECU);
wherein the VECU is configured to:
monitor environment signals from the environmental sensors;
determine whether the environment signals indicate a predicted coast opportunity; and
in response to determining that the environment signals indicate a predicted coast opportunity:
transmit a signal to cause the powertrain to be opened;
determine whether vehicle state signals from the vehicle state sensors indicate a set of conditions for stopping the engine are met; and
in response to determining that the set of conditions for stopping the engine are met, transmit a signal to cause the engine to be stopped;
wherein determining whether vehicle state signals from the vehicle state sensors indicate a set of conditions for stopping the engine are met includes:
predicting a time period for which the engine will be stopped; and
comparing the time period to a threshold time period for which fuel savings from shutdown outweigh a fuel cost of stopping and restarting the engine.

14. The vehicle of claim 13, wherein the environmental sensors further include one or more of a camera, a global positioning system (GPS) sensor, a LIDAR sensor, and a radar sensor.

15. The vehicle of claim 13, wherein the vehicle state sensors include one or more of a coolant temperature sensor, an engine speed sensor, a battery sensor, a driveline state sensor, a vehicle speed sensor, and an accelerator sensor.

16. The vehicle of claim 13, wherein the VECU is further configured to:
monitor the environment signals and the vehicle state signals to predict a time when engine power will be needed; and
transmit a signal to cause the engine to restart based on the predicted time when engine power will be needed.

17. The vehicle of claim 16, wherein the signal to cause the engine to restart is based on the predicted time when engine power will be needed and a predicted amount of time that restart of the engine will take.

18. The vehicle of claim 13, wherein the predicted coast opportunity is a predicted stop of the vehicle at a traffic control signal for which a signal received by the V2I wireless interface indicates will be red at a predicted arrival time of the vehicle, a predicted stop of the vehicle for an object in the path of the vehicle, a predicted stop of the vehicle for a railroad crossing, a predicted stop of the vehicle for a predicted turn of the vehicle, a predicted stop of the vehicle at a stop sign, a predicted downhill grade, a predicted speed limit reduction, or a predicted road curve.

19. The vehicle of claim 18, wherein the predicted coast opportunity further includes a lack of signals received by the V2I wireless interface or a V2V wireless interface of the vehicle indicating that an emergency vehicle is approaching.

20. The vehicle of claim 18, wherein the predicted coast opportunity further includes a determination of how quickly the vehicle is likely to decelerate, and a determination that engine drag or engine braking force does not need to be used to provide the predicted deceleration.

21. The vehicle of claim 13, wherein predicting a time period for which the engine will be stopped includes:
predicting a time period for which the engine will be stopped based on a signal received by a V2I wireless interface that indicates when a traffic light will change to allow the vehicle to proceed.

22. The vehicle of claim 13, wherein the set of conditions for stopping the engine of the vehicle includes one or more of:
an engine coolant temperature being between a low temperature threshold and a high temperature threshold;
a vehicle speed being below a high speed threshold;
an engine speed being below an engine speed threshold;
a battery state of charge being above a battery charge threshold; and
an after-treatment regeneration system being inactive.

23. The vehicle of claim 13, further comprising a decompression device, wherein the VECU is further configured to:
in response to determining that the set of conditions for stopping the engine are met, transmit a signal to cause the decompression device to be activated.

* * * * *